United States Patent
Katayama et al.

(10) Patent No.: US 6,580,994 B2
(45) Date of Patent: Jun. 17, 2003

(54) DRIVING FORCE CONTROLLING APPARATUS AND METHOD FOR FOUR-WHEEL DRIVE VEHICLE

(75) Inventors: Takeshi Katayama, Kanagawa (JP); Hajime Kosaka, Tochigi (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/173,650

(22) Filed: Jun. 19, 2002

(65) Prior Publication Data

US 2003/0036837 A1 Feb. 20, 2003

(30) Foreign Application Priority Data

Jun. 26, 2001 (JP) .......................... 2001-192485

(51) Int. Cl.$^7$ ................................. G06F 7/00
(52) U.S. Cl. ............... 701/69; 701/89; 180/248; 180/249; 477/5; 477/8; 477/35
(58) Field of Search .................... 701/69, 74, 80, 701/89; 180/65.2, 248, 249, 250; 477/3, 5, 8, 35

(56) References Cited

U.S. PATENT DOCUMENTS

| | | | | |
|---|---|---|---|---|
| 4,702,341 A | * | 10/1987 | Taga et al. .................. | 180/249 |
| 4,982,809 A | * | 1/1991 | Nakamura et al. .......... | 180/248 |
| 5,152,191 A | * | 10/1992 | Sato et al. .................... | 477/36 |
| 6,077,186 A | * | 6/2000 | Kojima et al. ................ | 477/3 |

FOREIGN PATENT DOCUMENTS

| | | |
|---|---|---|
| JP | 9-76895 | 3/1997 |
| JP | 10-141104 | 5/1998 |
| JP | 11-189150 | 7/1999 |
| JP | 2000-238630 | 9/2000 |
| JP | 2001-021320 | 1/2001 |
| JP | 2001-39287 | 2/2001 |
| JP | 2001-80376 | 3/2001 |

* cited by examiner

*Primary Examiner*—Gertrude Arthur
(74) *Attorney, Agent, or Firm*—Foley & Lardner (57) ABSTRACT

In driving force controlling apparatus and method for a four-wheel drive vehicle, a command is outputted to a front-and-rear wheel driving force distribution control system to reduce a clutch engagement force of a clutch such as a frictional clutch when a subtraction value of a detected value of a clutch transmission torque from that of a clutch input torque (Tinp−Tr) is smaller than a predetermined value ($\delta$) and detected wheel velocities of both of left and right road wheels of the vehicle are substantially equal to each other ($Vw1\pm\alpha=Vw2$ and $Vw3\pm\alpha=Vw4$).

11 Claims, 5 Drawing Sheets

DRIVING FORCE CONTROLLING APPARATUS AND METHOD FOR FOUR-WHEEL DRIVE VEHICLE

BACKGROUND OF THE INVENTION

1. Field of the Invention

The present invention relates to driving force controlling apparatus and method for a four-wheel drive vehicle in which a front-and-rear road wheel driving force distribution control system which variably controls a distribution ratio of a front-and-rear road wheel driving force according to an engagement control of a frictional clutch is mounted.

2. Description of the Related Art

Herein explained is, for example, an electronically controlled four-wheel drive vehicle on a front wheel drive basis. That is to say, when one of front road wheels is under an acceleration slip state during a vehicular run in a front wheel drive state on a low frictional coefficient ($\mu$) road surface so that a wheel velocity difference between the front and rear road wheels occurs, such a front-and-rear wheel driving force distribution control as a clutch engagement force of the frictional clutch is carried out to suppress a velocity difference between the front and rear road wheel velocities and part of the engine driving force is distributed over the rear road wheel side so that a driving force distribution ratio toward the front road wheels is reduced is carried out. Then, in a case where the front-and-rear road wheel velocity difference is not yet suppressed even if the driving force distribution ratio toward the front road wheels is reduced, the clutch engagement force of the frictional clutch is furthermore increased. Finally, the clutch is engaged in such a manner that the driving force distribution ratio between the front wheels which are engine directly coupled drive wheels (hereinafter, referred to as main driven wheels) and rear wheels which are clutch engaged driven wheels (hereinafter, referred to as auxiliary driven wheels) is 50%:50%.

However, in order to meet a demand to secure a driving force transmitted on a road surface with the acceleration slip suppressed when the acceleration slip is suppressed when such a four-wheel acceleration slip state that develops acceleration slips on front and rear road wheels in spite of the fact that the vehicle is running on an extremely low frictional road surface in the four-wheel drive state, a traction control system (abbreviated as TCS) such that an engine output is reduced or a braking force is given to each road wheel has been applied to the four-wheel drive vehicle.

A Japanese Patent Application First Publication No. 2001-039287 published on Feb. 13, 2001 exemplifies a previously proposed driving force controlling apparatus for the four-wheel drive vehicle in which a vehicular body velocity is estimated on the basis of velocities of the auxiliary driven wheels by the traction control system and an occurrence of the acceleration slip is determined according to a deviation between estimated vehicular velocity and detected wheel velocities of the main driven wheels so as to execute a TCS (Traction Control System) control.

SUMMARY OF THE INVENTION

However, since, in the traction control system in the four-wheel drive vehicle, the vehicular body velocity is estimated on the basis of the detected road wheel velocities, a larger vehicular body velocity is estimated with respect to actual vehicular body velocity under the four-wheel acceleration slip state (hereinafter, referred to as the estimated vehicular body velocity). The wheel acceleration slip cannot appropriately be determined, a TCS operation timing is delayed, and only an insufficient acceleration slip suppression can be made even by the TCS operation.

In order to solve the above-described inconveniences, a limitation is placed in the driving force distribution ratio toward the auxiliary driven wheels. The limitation is, for example, the driving force distribution ratio toward the main driven wheels (90%) and the driving force distribution ratio toward the auxiliary driven wheels (10%)=90%:10%. In a case where the limitation is provided for the driving force distribution ratio toward the main driven wheels, slower wheel velocities are developed on the auxiliary driven wheels, a synchronization of the four-wheel velocities can be provided and an accuracy of the estimation of a vehicular body velocity can be improved. However, a natural vehicular acceleration performance that the four wheel drive state has and in which the driving force distribution rate toward the auxiliary driven wheels is high cannot be exhibited.

Furthermore, in a case where the limitation is placed on the driving force distribution ratio to the auxiliary driven wheels in the front-and-rear driving force distribution control system, the frictional clutch is under a slip state and a temperature in the frictional clutch is accordingly raised, this repetitive operation of the frictional clutch gives a disadvantage against a durability in the frictional clutch.

It is, hence, an object of the present invention to provide driving force controlling apparatus and method for the four-wheel drive vehicle which can achieve both compatibilities between assurances of the vehicular acceleration performance that the four-wheel drive vehicle naturally has and an estimation accuracy of the vehicular body velocity at a high level while improving the durability in the frictional clutch.

According to one aspect of the present invention, there is provided a driving force controlling apparatus for a four-wheel drive vehicle, comprising: a front-and-rear wheel driving force distribution control system including a clutch disposed in a midway of an engine driving system of the vehicle through front and rear road wheels of the vehicle, the front-and-rear wheel driving force distribution control system executing a control to modify a driving force distribution ratio between the front and rear road wheels toward an equal-distribution ratio as a clutch engagement force of the clutch becomes stronger; a road wheel velocity detecting section that detects a road wheel velocity of each of the front and rear road wheels of the vehicle; a clutch input torque detecting section that detects a clutch input torque inputted from the engine driving system to the clutch; a clutch transmission torque detecting section that detects a clutch transmission torque which the clutch is enabled to transmit to an output portion of the clutch; and a clutch force reduction controlling section that outputs a command to the front-and-rear wheel driving force distribution control system to reduce the clutch engagement force of the clutch when a subtraction value of a detected value of the clutch transmission torque from that of the clutch input torque is smaller than a predetermined value and detected wheel velocities of both of left and right road wheels of the vehicle are substantially equal to each other.

According to another aspect of the present invention, there is provided driving force controlling method for a four-wheel drive vehicle, the four wheel drive vehicle comprising a front-and-rear wheel driving force distribution control system including a clutch disposed in a midway of an engine driving system of the vehicle through front and rear road wheels of the vehicle, the front-and-rear wheel driving force distribution control system executing a control to modify a driving force distribution ratio between the front and rear road wheels toward an equal-distribution ratio as a clutch engagement force of the clutch becomes stronger and the driving force controlling method comprising: detecting a road wheel velocity of each of the front and rear road wheels of the vehicle; detecting a clutch input torque inputted from the engine driving system to the clutch; detecting a clutch transmission torque which the clutch is enabled to transmit to an output portion of the clutch; and outputting a command to the front-and-rear wheel driving force distribution control system to reduce the clutch engagement force of the clutch when a subtraction value of a detected value of the clutch transmission torque from that of the clutch input torque is smaller than a predetermined value and detected wheel velocities of both of left and right road wheels of the vehicle are substantially equal to each other.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

(First Embodiment)

Figure 1:
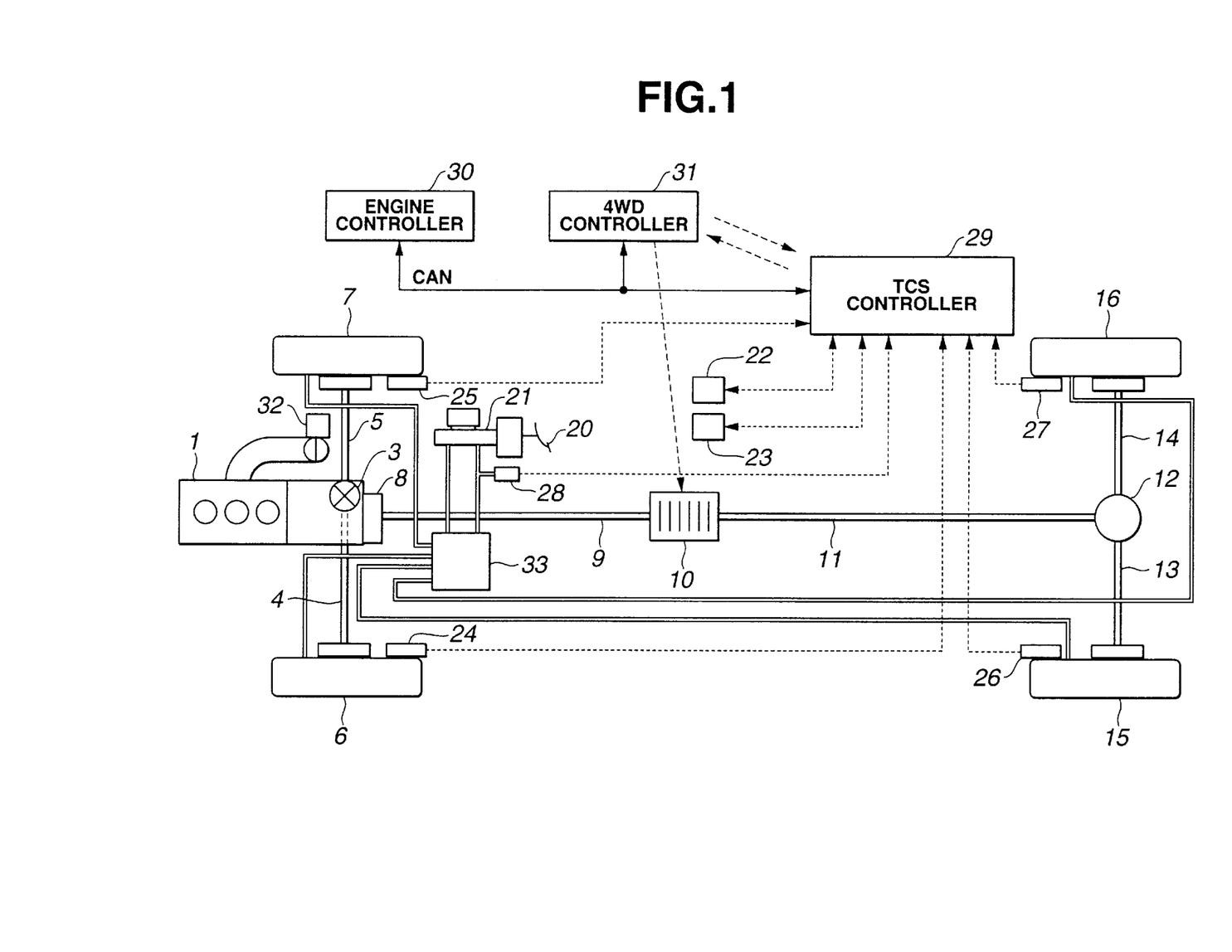
FIG. 1 is a whole system configuration view of a front wheel drive based four-wheel drive vehicle to which a driving force controlling apparatus in a first preferred embodiment according to the present invention is applicable.

FIG. 1 shows a system configuration view of a front wheel drive based four-wheel drive vehicle to which a driving force controlling apparatus in a first preferred embodiment according to the present invention is applicable.

In FIG. 1, a reference numeral 1 denotes an engine, a reference numeral 2 denotes an automatic transmission, a reference numeral 3 denotes a front differential, reference numerals 4 and 5 denote front drive shafts, reference numerals 6 and 7 denote front left and right road wheels (so-called, main driven wheels), a reference numeral 8 denotes a transfer, a reference numeral 9 denotes a transfer output shaft, a reference numeral 10 denotes a frictional clutch, a reference numeral 11 denotes a rear propeller shaft, a reference numeral 12 denotes a rear differential, reference numerals 13 and 14 denote rear drive shafts, and reference numerals 15 and 16 denote rear left and right road wheels. In the two-wheel drive (2WD) state in which a frictional clutch 10 is released, an engine drive torque is transmitted only to front left and right road wheels 6 and 7. In a four-wheel drive (4WD) state in which frictional clutch 10 is tightly engaged, part of engine driving torque is distributed according to a magnitude of the clutch engagement force. Thus, a front-wheel drive based four-wheel drive vehicle is structured, as shown in FIG. 1.

It is noted that, in FIG. 1, a reference numeral 20 denotes a brake pedal, 21 denotes a master cylinder, 22 denotes a steering angle sensor, 23 denotes a yaw rate/lateral G sensor, 24 denotes a front left wheel rotation sensor (which corresponds to road wheel velocity detecting section), 25 denotes a front right road wheel rotation sensor (wheel velocity detecting section), 26 denotes a rear left wheel rotation sensor (road wheel velocity detecting section), 27 denotes a rear right wheel rotation sensor (wheel velocity detecting section), 28 denotes a pressure sensor, 29 denotes a TCS controller, 30 denotes an engine controller, 31 denotes a 4WD controller, 32 denotes an electronically controlled throttle, and 33 denotes a TCS/ABS brake actuator.

Sensor signals of steering angle sensor 22, yaw rate/lateral G sensor 23, front left road wheel rotation sensor 26, rear right road wheel rotation sensor 27, and pressure sensor 28 are inputted to TCS controller 29. Each road wheel velocity detected by means of respective rotation sensors 24 through 27 is denoted as follows: that of front left road wheel Vw1, that of front right road wheel is Vw2, that of rear left road wheel is Vw3, and that of rear right road wheel is Vw4.

TCS controller 29 inputs these sensor signals and executes a calculation of a target engine torque required for a TCS (Traction Control System) control and a calculation of a target brake liquid pressure required during the TCS control when determining that an acceleration slip occurs and outputs a command to reduce the driving force to engine controller 30 and TCS/ABS brake actuator 33. While a necessary information from 4WD controller 31 is inputted, a request to weaken the clutch engagement force of frictional road wheel correction coefficient thereat is outputted to 4WD controller 31 when a predetermined clutch force reduction control condition is established.

Engine controller 30 upon receipt of the command issued from TCS controller 29 executes a control over an opening angle of a throttle motor of electronically controlled throttle 32 and executes a fuel cut-off control over each fuel injector of engine 1, upon receipt of a command issued from another base block.

4WD controller 31 determines a target clutch transmission torque T* on the basis of a predetermined 4WD control rule and outputs a clutch engagement force command TETS (for example, a current command to a solenoid in a case of an electromagnetic clutch) to frictional clutch 10 to obtain the determined target clutch transmission torque T*. Thereby, the front-and-rear road wheel driving force distribution ratio is controlled to provide an optimum front-and-rear road wheel driving force distribution ratio according to the situation of the vehicular run and vehicular condition over a controllable range from front road wheel driving force distribution ratio:rear road wheel driving force distribution ratio=100%:0% (a front road wheel driven state) to front road wheel driving force distribution ratio:rear road wheel driving force distribution ratio=50%:50% (a direct coupled four-wheel drive state). In addition, if a clutch engagement force command RQ_TRQ to weaken the clutch engagement force of frictional clutch 10 from TCS controller 29 is inputted, a clutch engagement force command TETS to obtain the clutch engagement force request RQ_TRQ by which the clutch engagement force is weakened to frictional clutch 10 in place of clutch engagement force command TETS to obtain target clutch transmission torque T*.

It is noted that a CAN communication line (a multiplex communications line) is used to interconnect between TCS controller 29, engine controller 30, and 4WD controller 31. Each controller of TCS controller 29, engine controller 30, and 4WD controller 31 is constituted by a microcomputer having a MPU (MircoProcessor Unit), ROM (Read Only Memory), a RAM (Random Access Memory), an Input-Output Interface, NIC (Network Interface Card), a common bus, and so forth.

Next, an operation of the first embodiment of the driving force controlling apparatus according to the present invention will be described below.

[4WD Control Action]

A 4WD control carried out by 4WD controller 31 is, for example, as follows: 4WD controller 31 calculates such a front-and-rear rotation speed difference torque TΔV as to increase a clutch transmission torque as a velocity difference ΔVw of the front and rear road wheels becomes larger and such a driving force basic distribution torque TENG calculated from a rear road wheel weight distribution ratio of a weight distribution of front and rear road wheels, determined target clutch transmission torque T* by carrying out a select-high method for a plurality of torques calculated thereby, and outputs a clutch engagement force command TETS to frictional clutch 10 to obtain target clutch transmission torque T* (front-and-rear road wheel driving force distribution control system).

[TCS Control Action]

The TCS control carried out in TCS controller 29 is as follows: TCS controller 29 determines whether the acceleration slip occurs on the basis of road wheel velocity information, calculates a required target engine torque and a required target brake liquid pressure when determining that an acceleration slip has occurred and, then, outputs the command to engine controller 30 and TCS/ABS brake actuator 33 to reduce the driving force to engine controller 30 and TCS/ABS brake actuator 33.

It is noted that estimated vehicular body velocity Vref(t) which is a basis of a criterion of a presence or absence of the acceleration slip is given from the following equations:

$$Vref(t) = Vref1 + Kc(Vw - Vref1). \quad (1)$$

$$Vref1 = Vref(t-1) + amodel \cdot \Delta t. \quad (2)$$

$$amodel = Fx/m = (T_1 - T_2)/r \cdot m \quad (3)$$
$$= \{(T_{ENG} - I_{ENG} \cdot d\omega t) \times Kg - T_{BK} - I\omega \cdot d\omega w\}/r \cdot m.$$

In equations (1), (2), and (3), when amodel>$a_{L1}$, amodel=$a_{L1}$.

Vref(t): the present vehicular body velocity derived at the present calculation period (=estimated vehicular body velocity).

Vref(t−1): vehicular body velocity derived at a calculation period before one cycle.

Vref1: a vehicular body velocity before the amendment.

Vw: vehicular road wheel velocity (during the driving, the select-low method of rear road wheel velocities Vw3 and Vw4 and during the braking the select-high method of rear road wheel velocities of Vw3 and Vw4).

Kc: correction coefficient.
amodel: a model estimated acceleration.
Δt: a unit time.
$a_{L1}$: acceleration limit value.
Kg: a gear ratio.
ωt: engine speed.
Fx: a rectilinear force applied to a vehicular body.
$T_2$: a braking torque applied to a tire wheel.
$T_{BK}$: a brake torque.
$T_{ENG}$: an engine torque.
$I_{ENG}$: an engine inertia.
Iω: a wheel inertia.
r: a tire radius.
dωt: an engine speed variation.
dωw: a road wheel acceleration.
$T_1$: a driving torque applied to the tire wheel.
m: a vehicular body mass.

Figure 4:
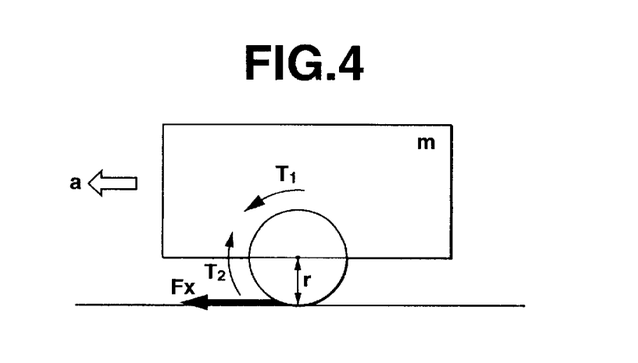
FIG. 4 is a vehicular model view for explaining an estimation calculation of a vehicular body velocity in the driving force controlling apparatus in the first preferred embodiment according to the present invention.

That is to say, as shown in equation (3) and FIG. 4, model estimated acceleration a model can be estimated by dividing a rectilinear force Fx applied to the vehicle body derived from engine torque $T_{ENG}$, braking torque $T_{BK}$, engine revolution speed variation dωt, and a vehicular road wheel acceleration dωw, and vehicular specification with vehicular body mass. The present vehicular body velocity Vref(t) can be determined from the vehicular body velocity Vref1, road wheel velocity Vw, and correction coefficient Kc according to equation (1).

Then, a vehicular acceleration slip quantity S can be determined according to the following equation (4):

$$Vwf - Vref(t) = S \quad (4),$$

wherein Vwf: front road wheel velocity (a select-high value of front left and right road wheel velocities Vw1 and Vw2). That is to say, vehicular acceleration slip quantity S can be calculated according to a deviation between the front wheel velocity Vwf and the presently estimated vehicular body velocity Vref(t).

When acceleration slip quantity S is equal to or higher than acceleration slip threshold value S0, TCS controller 29 determines that the acceleration slip occurs and carries out the TCS control when the acceleration slip has occurred (S≧S0).

[Clutch Force Reduction Control Procedure]

Figure 2:
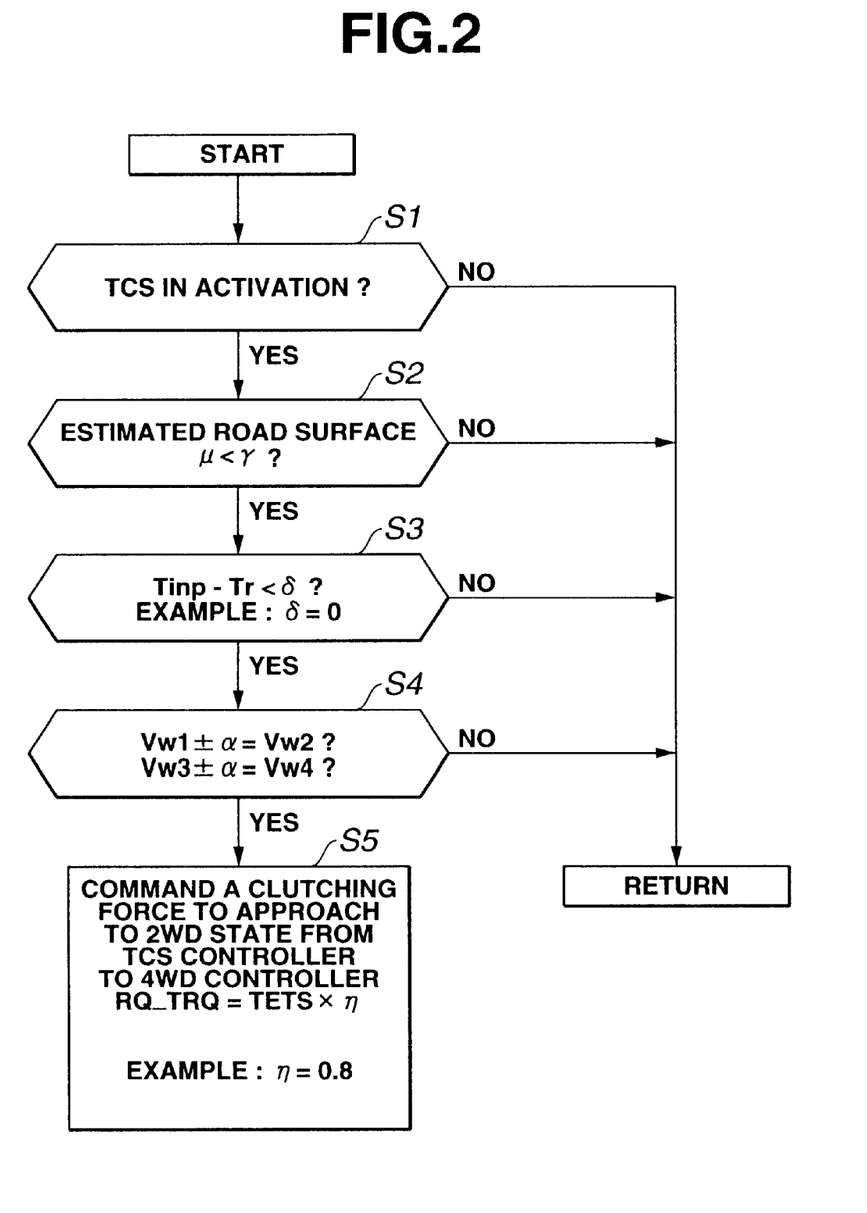
FIG. 2 is an operational flowchart representing a flow of a clutch force reduction controlling section of a TCS controller in the first preferred embodiment according to the present invention.

FIG. 2 shows a flowchart representing a flow of a clutch engagement force reduction control procedure (clutch force reduction controlling section) executed by a clutch force reduction controlling section of TCS controller 29. Each step shown in FIG. 2 will be described below.

At a step S1, TCS controller 29 determines whether a TCS is being activated according to a state of TCS operation flag. If TCS is being activated (Yes) at step S1, the routine goes to step S2. If not operated (No) at step S1, the routine is returned to a return process. At a step S2, TCS controller 29 determines whether an estimated frictional coefficient μ of a road surface on which the vehicle is running derived according to the calculation to be described later is lower than a preset frictional coefficient γ (wherein γ=0.2). If Yes at step S2, the routine goes to a step S3. If No at step S2, the routine goes to the return process.

At step S3, TCS controller 29 determines whether a value of a subtraction of an actual clutch transmission torque Tr (detected value of the clutch transmission torque) from the clutch force command TETS obtained from the information input from 4WD controller 31 from estimated clutch input torque Tin derived from a calculation in the 4WD as will be described later. If Yes at step S3, the routine goes to a step S4. If No at step S3, the routine is returned to zero and the reference numerals in the floor side.

If, at step S4, TCS controller 29 determines whether front road wheel velocities Vw1 and Vw2 are equal to each other (Vw1±α=Vw2) and rear road wheel velocities Vw3 and Vw4 are equal to each other (Vw3±α=Vw4). If Yes at step S4, the routine goes to a step S5. If No at step S4, the routine goes to the return process. However, the determination of whether the road wheel velocities of the left and right road wheels are equal to each other is made according to the following equation permitting an error of α (α is, for example, 1.0 Km/h).

$$Vw1 \pm \alpha = Vw2 \text{ and } Vw3 \pm \alpha = Vw4 \tag{5}$$

At step S5, TCS controller 29 outputs a clutch engagement force request RQ_TRQ to approach to the 2WD state from TCS controller 29 to 4WD controller 31. Here, clutch engagement force request RQ_TRQ is given according to the following equation (6). RQ_TRQ=TETS×η (6), wherein TETS: a clutch engagement force command retrieved from 4WD controller 31; and η; a coefficient (for example, fixed value such as η=0.8).

[Estimation of Clutch Input Torque and Clutch Transmission Torque]

An estimated clutch input torque Tinp inputted from frictional clutch 10, passing through the transfer output shaft 9 from engine driving system is determined according to the calculation method described below (clutch input torque detecting section). For example, the engine torque is estimated according to the accelerator opening angle and engine speed, the transmission output shaft torque TRQD is calculated with the amplification factor of the torque converter and transmission gear coefficient taken into consideration. The estimated clutch input torque Tinp is calculated according to the following equation which is a multiplication of a front final gear ratio and a transfer gear ratio. Tinp=TRQD× Final ratio×transfer ratio (7). The clutch transmission torque which is transmissible to rear wheels 15 and 16 (clutch output portion) can be obtained by inputting clutch engagement force command TETS from 4WD controller 31 and deriving the map and calculation processing predetermined from the actual clutch transmission torque Tr (clutch transmission torque detecting section). That is to say, the clutch engagement force command TETS outputted from 4WD controller 31 is the command to obtain target clutch transmission torque T* at frictional clutch 10 determined finally. Hence, actual clutch transmission torque Tr obtained from the clutch engagement force command TETS can be estimated which is the clutch transmission torque transmissible to rear road wheel sides 15 and 16 from frictional clutch 10.

[Estimation of Road Surface Frictional Coefficient]

The estimated road surface frictional coefficient μ is estimated from a rectilinear force Fx applied to the vehicular body and a vertical weight Fz (road surface frictional state estimating section). That is to say, the rectilinear force Fx applied to the vehicle body is determined according to engine torque $T_{ENG}$, braking torque $T_{BK}$, engine revolution speed variation dωt, road wheel acceleration dωw, and vehicular specification using the following equation (8).

$$Fx = \{(T_{ENG} - I_{ENG} \cdot d\omega t) \times \gamma - T_{BK} - I\omega \cdot d\omega w\}/r \tag{8}$$

In addition, a relationship between rectilinear force Fx and vertical weight Fz is expressed as follows:

$$Fx = \mu \cdot Fz \tag{9}$$

Vertical weight FZ gives μ=Fx/Fz according to equation (9) since vertical weight Fz is known from the weight condition of the vehicle. From μ=Fx/Fz according to the equation (9) since vertical weight Fz is known from the vehicular weight condition, the estimated road surface frictional coefficient μ can be calculated.

[Clutch Force Reduction Control Action]

First, 4WD control will briefly be described. 4WD controller 31, for example, controls the clutch engagement force of frictional clutch 10 so that a value of select-high of front-and-rear rotation speed difference TΔV calculated according to front-and-rear road wheel speed difference ΔVw and a driving force basic distribution torque $T_{ENG}$ determined according to an accelerator opening angle (approximately equal to a throttle valve opening angle), driving force basic distribution torque $T_{ENG}$, and a value of the select high of front-and-rear rotation speed difference torque TΔV calculated by the front-and-rear road wheel speed difference ΔVw.

In a case where the slip does not occur on front road wheels 6 and 7 during the vehicular start, the engine torque is estimated from accelerator opening angle (approximately equal to throttle valve opening angle) and engine speed. Then, frictional clutch 10 is controlled to give the clutch transmission torque to obtain driving force basic distribution torque TENG corresponding to a rear road wheel side weight ratio of the transfer output calculated by the gear ratio.

When front road wheels 6 and 7 slip under this state and front-and-rear road wheel velocity difference ΔVw is developed, front-and-rear rotation speed difference torque TΔV according to a magnitude of front-and-rear road wheel velocity difference ΔVw is calculated. If rotation speed difference torque TΔV is larger than driving force basic distribution torque TENG, the clutch engagement force is increased to obtain the front-and-rear rotation speed difference torque TΔV so that more large torque is transmitted to rear road wheels 15 and 16 which are auxiliary driven wheels. Furthermore, since front-and-rear road wheel velocity difference ΔVw is converged and vehicular velocity is raised so that transfer output torque TOUT is decreased. Hence, a gradual reduction of the clutch engagement force in accordance with the reduction in driving force basic distribution torque TENG. Transmission torque toward rear road wheels 15 and 16 which are auxiliary driven wheels is reduced.

On the other hand, the TCS control will briefly be explained. That is to say, TCS controller 29 estimates acceleration from engine torque and vehicular specification, estimates the vehicular body velocity by correcting the road wheel velocity according to its integration value, and carries out the traction control by reducing the engine output and by giving the brake liquid pressure when determining that the acceleration slip occurs according to the vehicular body velocity and road wheel velocity.

Suppose, for example, that the vehicle runs on an extremely low frictional coefficient μ road surface such as an icy road, a snowy road. In spite of a small acceleration manipulation variable, large acceleration slips occur on front left and right road wheels 6 and 7. In this case, the 4WD control such that frictional clutch 10 is strongly engaged is carried out and, in the TCS control, the traction control is executed. That is to say, the TCS activation condition at step S1 of FIG. 2 and low μ road surface condition at step S2 of FIG. 2 are established.

Then, if large front-and-rear road wheel velocity difference ΔVw is developed during the extremely low μ road vehicular run, frictional clutch 10 is engaged by means of 4WD control so that the vehicle is in the directly coupled 4WD drive state in which no slip on frictional clutch 10 is absent (front-and-rear road wheel distribution rate= 50%:50%). In this case, Tinp−Tr<0, namely, a value of a subtraction of clutch transmission torque Tr from estimated clutch input torque Tinp is smaller than zero (0) and the 4WD drive distribution condition at step S3 is established. In addition, since the drive system of the front-and-rear wheels is directly coupled so that a velocity difference between the left and right road wheels is extremely small due to the vehicular run on the extremely low frictional coefficient road even though the differential between the left and right road wheels is present, such a condition as the same left and right road wheel velocities is established. Hence, steps S3 and S4 serve to determine whether there is a possibility that the estimated vehicular body velocity is raised.

Figure 3A:
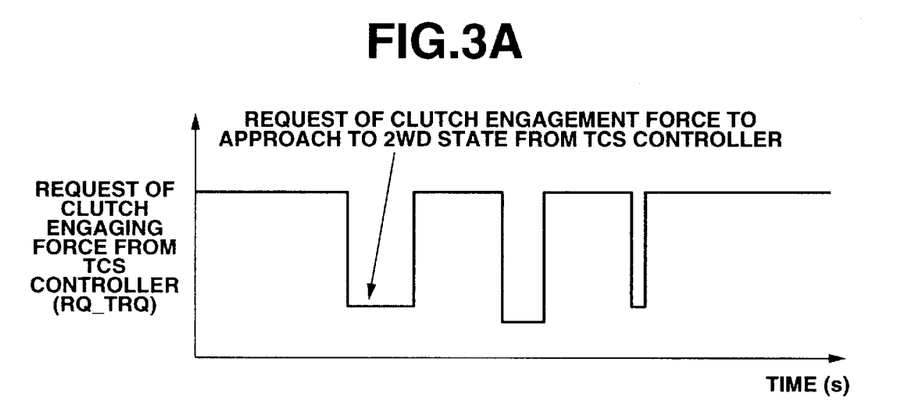
FIGS. 3A and 3B are timing charts in a case where the clutch force reduction control is carried out in the first embodiment of the driving force controlling apparatus according to the present invention.
Figure 3B:
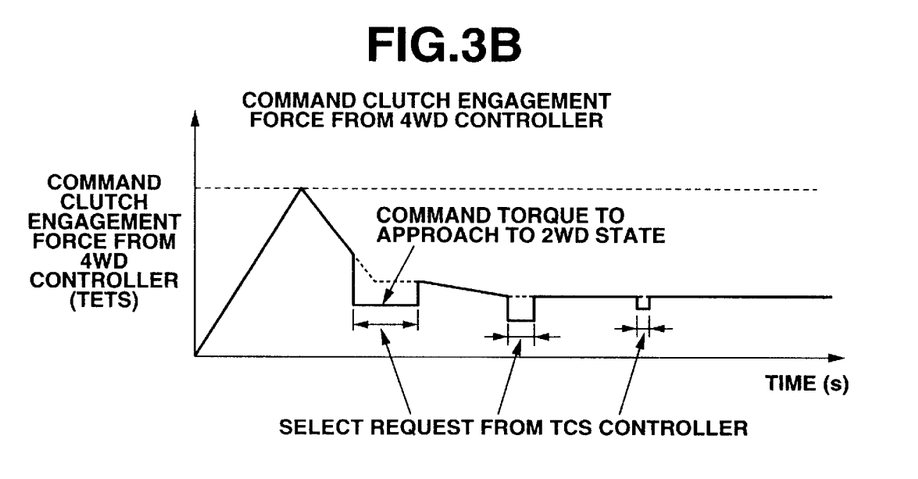

As described above, when the vehicle runs on a vehicular running situation such that each condition is established as described above, the routine goes to steps S1→step S2→step S3→step S4→step S5 in the flowchart of FIG. 2. At step S5, clutch force request RQ_TRQ to approach to the 2WD state at step S5 is outputted from TCS controller 29 to 4WD controller 31. For example, as shown in a timing chart of FIG. 3A, clutch engagement force request RQ_TRQ is outputted from TCS controller 29 to 4WD controller 31 to approach to 2WD state. At this time, as shown in another timing chart of FIG. 3B, 4WD controller 31 selects a request from TCS controller 29 and outputs clutch engagement force command TETS to obtain RQ_TRQ to weaken the clutch engagement force to frictional clutch 10 in place of clutch engagement force command TETS to obtain target clutch transmission torque T*. Consequently, clutch engagement force is temporarily reduced.

As described above, in the clutch force reduction control, each of the conditions of the TCS being activated at step S1, the extremely low frictional coefficient road running condition, the 4WD drive distribution state condition at step S3, and the same left and right road wheel velocities at step S4 is established simultaneously. Since there is a possibility that the present vehicular body velocity Vref(t) calculated on the basis of the road wheel velocities, the clutch engagement force of frictional clutch 10 is reduced only if there is a possibility that the present vehicular body velocity Vref(t) calculated on the basis of the road wheel velocities is raised. In addition, only at a time such a necessity that the acceleration slips occur on four road wheels occurs, the engagement force of frictional clutch 10 is reduced. Hence, the synchronization of the four-wheel road wheel velocities is prevented from occurring, the estimated accuracy of the present vehicular body velocity Vref(t) on the basis of the wheel velocities can be assured.

Next, an advantage of the driving force controlling apparatus in the first embodiment will be described below.

(1) In a case where a value of subtraction of clutch transmission torque Tr from estimated clutch input torque Tinp is smaller than a predetermined value of $\delta$ and where the road wheel velocities of left and right road wheel velocities are approximately equal to each other, clutch force reduction controlling section to output clutch engagement force request RQ_TRQ to approach to 2WD state to 4WD controller 31 is provided, the compatibility of both assurances of the vehicular acceleration performance that the 4WD drive state naturally has and the accuracy of the estimated vehicular body velocity can be achieved. That is to say, when the clutch force reduction control condition is not established, 4WD controller 31 is normally operated so that the vehicular acceleration performance that the 4WD drive state naturally has can be assured. In addition, unless all clutch force reduction control conditions are established, the clutch engagement force reduction control for frictional clutch 10 is not carried out, the frequency of the slip engagement state of frictional clutch 10 is suppressed and the durability of frictional clutch 10 is improved.

(2) Since the TCS being activated condition (step S1 of FIG. 2) is added to the clutch force reduction control conditions, the synchronization of four-wheel road wheel velocities during the necessity of the acceleration slip determination by means of TCS controller 29 is prevented from occurring. Then, the accuracy of the estimation on the present vehicular body velocity Vref(t) on the basis of the detected road wheel velocity can be assured. Consequently, such problems that the appropriate determination of the vehicular road wheel acceleration slip by TCS controller 29 cannot be made, sufficient acceleration slip cannot be suppressed even if the TCS activation timing is delayed and even if the TCS is activated, the acceleration slips cannot sufficiently be suppressed are eliminated.

(3) Since the low frictional coefficient ($\mu$) road condition (step S2 of FIG. 2) is added to the clutch force reduction control condition, a high acceleration performance due to the directly coupled 4WD drive state or an approximately 4WD drive state near to the direct couple state can be exhibited and the durability of frictional clutch 10 can be improved through the prevention of the unnecessary slip of frictional clutch 10.

(Second Embodiment)

In a second embodiment of the driving force controlling apparatus according to the present invention, a clutch temperature condition is added to the clutch force reduction control conditions in the first embodiment (refer to FIG. 2) and the clutch force reduction quantity in the clutch force reduction control is variable according to the front-and-rear road wheel velocity difference $\Delta Vw$ (front road wheel velocity average value—rear road wheel velocity average value). It is noted that since the structure of the driving force controlling apparatus in the second embodiment is generally the same as that described in the first embodiment, the detailed explanation thereon will herein be omitted.

Next, an action of the driving force controlling apparatus will be described below.

[Clutch Force Reduction Control Process]

Figure 5:
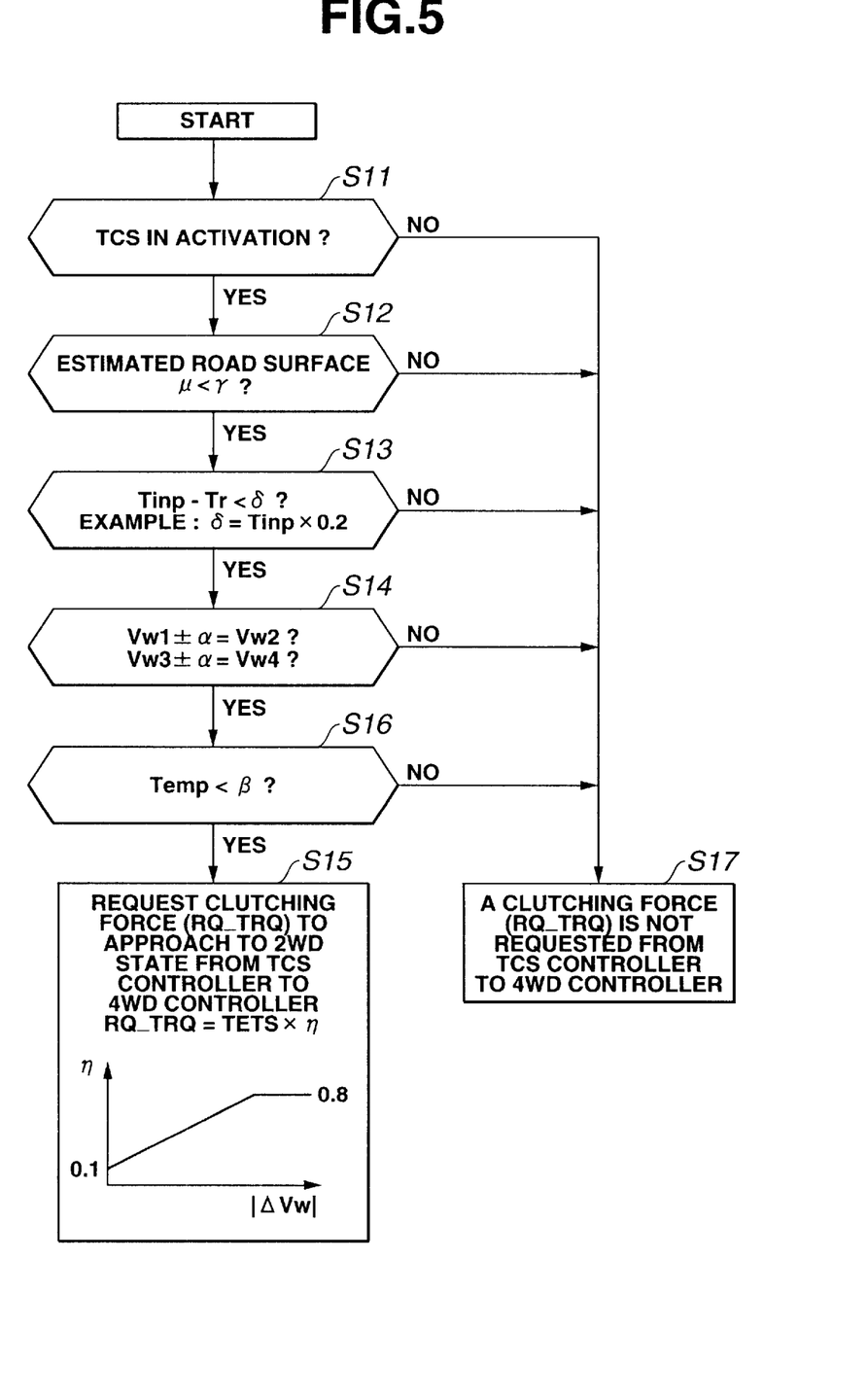
FIG. 5 is an operational flowchart representing a flow of a clutch force reduction control procedure executed in a clutch force reduction controlling section of the TCS controller in a second preferred embodiment.

FIG. 5 shows an operational flowchart representing a flow of the clutch force reduction control procedure executed at clutch force reduction controlling section of TCS controller 29 in the second embodiment.

At a step S13, TCS controller 29 determines whether a value of a subtraction of a clutch transmission torque Tr (a detected value of the clutch transmission torque) from estimated clutch input torque Tinp (a detected value of clutch input torque) is smaller than a predetermined value $\delta$ (for example, $\delta=\text{Tinp}\times0.2$). If Yes (Tinp−Tr<$\delta$, $\delta=\text{Tinp}\times0.2$) at step S13, the routine goes to step S14. If No at step S13, the routine goes to the return process. It is noted that the four-wheel drive distribution state condition at step S13 is established even when the engine drive system is in the four-wheel drive state such that the slip slightly occurs, other than a case where frictional clutch 10 is in the lock state.

At a step S16, TCS controller 29 determines whether clutch estimated temperature Temp according to the estimation temperature is lower than a preset threshold value $\beta$ (for example, $\beta=180°$ C.). If No at a step S16, the routine goes to a step S17. At step S17, clutch engagement force RQ_TRQ to be issued from TCS controller 29 to 4WD controller 31 for the vehicle to approach to the 2WD state is not requested. If Yes at step S16, the routine goes from step S16 to step S15.

It is noted that clutch estimated temperature Temp is calculated as follows: That is to say, detecting the relative rotation velocity difference between input and output shafts of frictional clutch 10, estimating the drive torque transmitted via frictional clutch 10, calculating an input energy applied to frictional clutch 10 according to clutch rotation velocity difference and clutch transmission torque, predicting a variation in a clutch temperature which is raised or lowered as a time has passed in accordance with the calculated input energy, and calculating a clutch estimated temperature on the basis of the predicted variation in the clutch temperature. The above-described method of estimating clutch temperature Temp corresponds to clutch temperature detecting section. It is of course that clutch temperature Temp may directly be detected using a temperature sensor installed on frictional clutch 10.

At a step S15, clutch engagement force request RQ_TRQ to approach to the 2WD state from TCS controller 29 to 4WD controller 31. It is noted that clutch engagement force request RQ_TRQ was given as follows: RQ_TRQ= TETS×η (11), wherein TETS denotes a clutch engagement force command retrieved from 4WD controller 31 and η denotes a coefficient. For example, in a region in which front-and-rear road wheel velocity difference ΔVw reaches to predetermined value δ, such a large variable ($0.1 \leq \eta \leq 0.8$) as the front-and-rear road wheel velocity difference ΔVw becomes larger is given. Over the region equal to or larger than predetermined value, such a fixed value as η=0.8 is given. It is noted that since other steps of S11, S12, and S14 are the same as those steps S1, S2, and S4 shown in FIG. 2, the detailed description thereof will be omitted herein.

[Clutch Force Reduction Control Action]

For example, if all of the conditions that the TCS is activated at step S11, the condition that the vehicle is running on the extremely low frictional coefficient road at step S12, the condition that the vehicle is running on four-wheel drive distribution rate at step S13, the condition that the left and right road wheel velocity difference ΔVw is lower than predetermined value δ (viz., the left and right road wheel velocities are approximately the same), the clutch temperature condition at step S16 are established, the routine goes to a step S15 in which clutch engagement force request RQ_TRQ is outputted to approach to the 2WD state in the flowchart shown in FIG. 5.

Figure 6A:
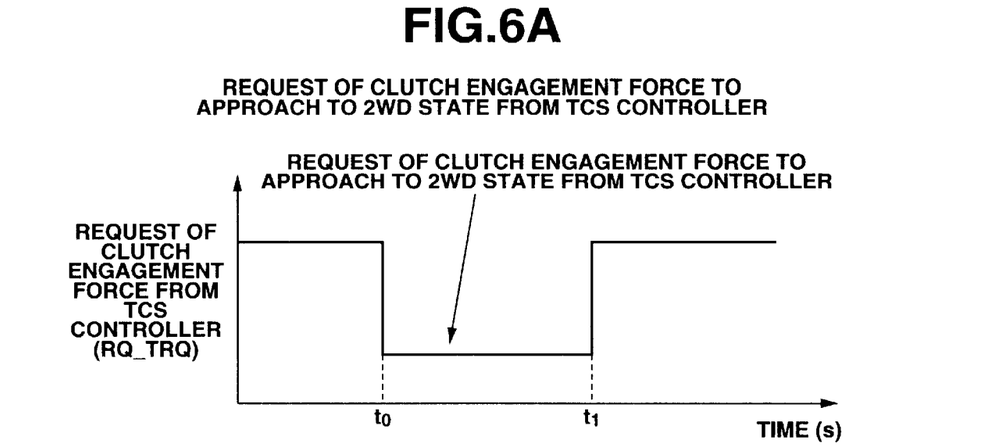
FIGS. 6A, 6B, and 6C are timing charts for explaining an operation when the clutch force reduction control is carried out in the driving force controlling apparatus in the second embodiment according to the present invention.
Figure 6B:
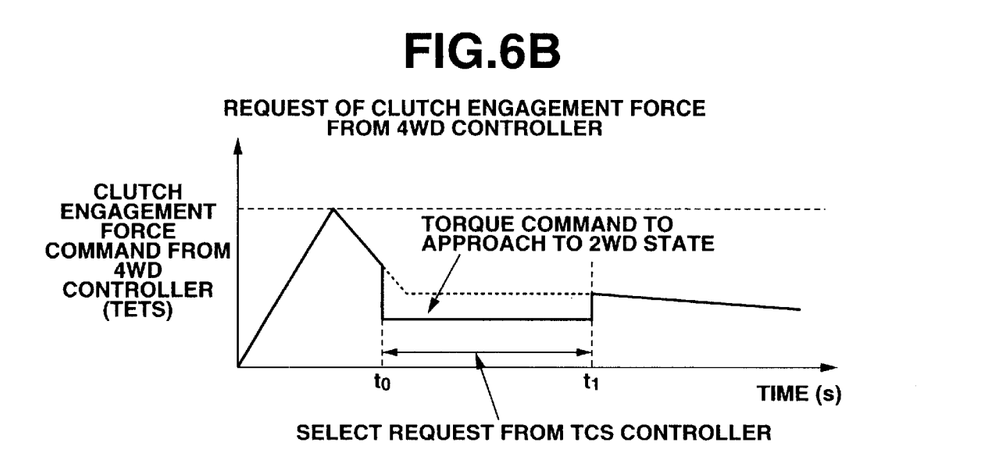

As shown in a timing chart of FIG. 6A, clutch engagement force request RQ_TRQ is outputted to approach to the 2WD state of the vehicle from TCS controller 29 to 4WD controller 31 at a time t0. The 4WD controller 31 selects the request from TCS controller 29 as shown in the timing chart of FIG. 6B and outputs clutch engagement force command to frictional clutch 10 to obtain clutch engagement force request RQ_TRQ which weakens the clutch engagement force in place of the clutch engagement force command TETS by which the target clutch transmission torque T* is obtained. Hence, the clutch engagement force is reduced.

Figure 6C:
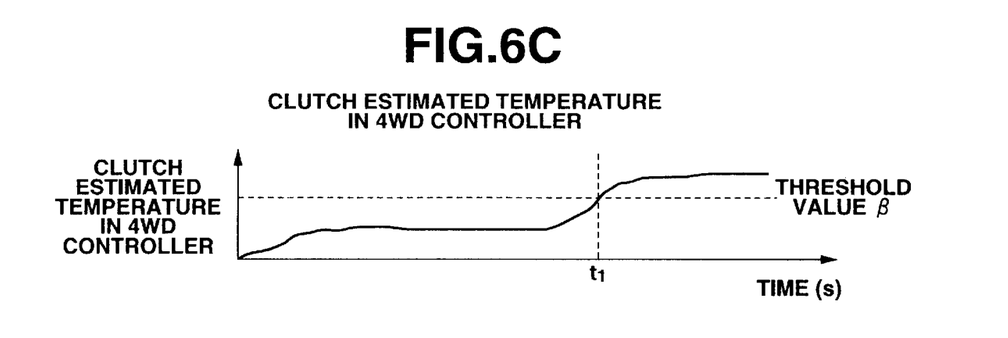

As shown in a timing chart of FIG. 6C, clutch temperature is raised due to the slip on frictional clutch 10 by continuing the reduction of clutch engagement force from a time point t0 to a time point t1. If clutch estimated temperature Temp at time point t1 is equal to or higher than threshold value β, the flow shown in FIG. 5 advances from step S16 to step S17. Hence, the clutch engagement force of frictional clutch 10 is returned to clutch engagement force of frictional clutch 10 is returned to clutch engagement force command TETS to obtain target clutch transmission torque T* by means of the 4WD control.

The advantage in the second embodiment will be described as follows: That is to say, in the driving force controlling apparatus for the 4WD vehicle in the second embodiment, the following advantages can be achieved in addition to the advantages ((1), (2), and (3) described above) that the driving force controlling apparatus in the first embodiment has.

(4) Since, in a case where clutch estimated temperature Temp is lower than threshold value β and the other control conditions are established, the clutch force reduction controlling section is installed which outputs the command to reduce clutch engagement force for frictional clutch 10 to 4WD controller 31. Hence, in a case where clutch estimated temperature Temp is equal to or higher than threshold value β, frictional clutch 10 is maintained in the lock state or maintained in almost the same state of the lock state even if the other clutch force reduction conditions are established. Hence, the temperature rise of the frictional clutch 10 is suppressed and the durability of frictional clutch 10 can be improved.

(5) Since, in the clutch force reduction control, coefficient η becomes smaller as front-and-rear road wheel velocity difference ΔVw becomes smaller and the reduction quantity of clutch engagement force with respect to frictional clutch 10 becomes larger as front-and-rear road wheel velocity difference ΔVw becomes smaller, both improvement in estimated accuracy of the vehicular body velocity and assurance of the acceleration performance in the 4WD drive state can sufficiently be compatible in accordance with a synchronization tendency of road wheel velocities of the four road wheels.

That is to say, since there is a higher synchronization tendency in the four wheel road wheel velocities as the front-and-rear road wheel velocity difference ΔVw becomes smaller, the reduction quantity of the clutch engagement force becomes increased. In other words, a more slip of frictional clutch 10 can improve the accuracy of the estimated vehicular body velocity. In addition, since the synchronization tendency of four road wheel velocities is lower as the front-and-rear road wheel velocity difference ΔVw becomes larger, the reduction quantity of the clutch engagement force becomes smaller in accordance with a magnitude of the front-and-rear road wheel velocity difference ΔVw. In other words, a slip rate of the frictional clutch 10 is not set to be high so as not to develop the slip so that a sacrifice of the acceleration performance due to the driving system can be prevented.

(Other Embodiments)

As described hereinabove, the driving force controlling apparatus for the four-wheel drive vehicle according to the present invention has been explained on the basis of each of the first and second embodiments. However, a specific structure of the driving force controlling apparatus is not limited to each of the first and second embodiments. Various design modifications and additions may be made without departing from the scope of the present invention.

In each of the first and second embodiments, the present invention is applicable to front-wheel drive based four-wheel vehicle. However, the present invention is equally applicable to a rear-wheel drive based four-wheel drive vehicle in which the rear road wheels are main driven wheels and the front road wheels are auxiliary drive wheels.

Although, in each of the first and second embodiments, the present invention is applicable to the front wheel drive based four-wheel drive vehicle in which only 4WD control system is mounted. In this case, the clutch force reduction controlling section may be installed in 4WD controller.

In each of the first and second embodiments, the present invention is applicable to the four-wheel drive vehicle in which the TCS control system is mounted. However, the present invention is equally applicable to the four-wheel drive vehicle in which one or more plural control systems estimating the vehicular body velocity on the basis of detected road wheel velocities such as ABS control systems (ABS) to prevent brake locks and a VDC control system (Vehicular Dynamic Control) to control vehicular dynamic characteristics (or vehicular behavior).

For example, in a case of the four-wheel drive vehicle in which ABS control system is mounted, when the ABS braking is applied to a vehicular brake system in a state wherein the estimated vehicular body velocity indicates a larger value than the usual, the ABS is activated at an earlier timing than the usual and there is a high possibility that a deceleration is insufficient and that an unmatched feeling of depression on a brake pedal (a feeling as if the driver depressed a plate) is developed. However, since such a clutch force reduction control as described above is adopted, such an insufficient deceleration and unmatched feeling on the depression of pedal as described above can be prevented.

Furthermore, the traction system is applicable to the engine driving force reduction control. However, the traction system is also applicable to a braking force increase control. In addition, although frictional clutch has been described in each of the first and second embodiments, hydraulic clutch or electromagnetic clutch may be applied in place of the frictional clutch.

The entire contents of Japanese Patent Application No. 2001-192485 (filed in Japan on Jun. 26, 2001) are herein incorporated by reference. Various modifications and variations can be made without departing from the sprit of the present invention. The scope of the invention is defined with reference to the following claims.

What is claimed is:

1. A driving force controlling apparatus for a four-wheel drive vehicle, comprising:
    a front-and-rear wheel driving force distribution control system including a clutch disposed in a midway of an engine driving system of the vehicle through front and rear road wheels of the vehicle, the front-and-rear wheel driving force distribution control system executing a control to modify a driving force distribution ratio between the front and rear road wheels toward an equal-distribution ratio as a clutch engagement force of the clutch becomes stronger;
    a road wheel velocity detecting section that detects a road wheel velocity of each of the front and rear road wheels of the vehicle;
    a clutch input torque detecting section that detects a clutch input torque inputted from the engine driving system to the clutch;
    a clutch transmission torque detecting section that detects a clutch transmission torque which the clutch is enabled to transmit to an output portion of the clutch; and
    a clutch force reduction controlling section that outputs a command to the front-and-rear wheel driving force distribution control system to reduce the clutch engagement force of the clutch when a subtraction value of a detected value of the clutch transmission torque from that of the clutch input torque is smaller than a predetermined value and detected wheel velocities of both of left and right road wheels of the vehicle are substantially equal to each other.

2. A driving force controlling apparatus for a four-wheel drive vehicle as claimed in claim 1, further comprising: an acceleration slip detecting section that detects whether an acceleration slip of any one of the road wheels of the vehicle has occurred; and a traction control system that executes a reduction control of a driving force transmitted from drive wheels to a road surface on which the vehicle is running when the acceleration slip detecting section detects that the acceleration slip has occurred, wherein the clutch force reduction controlling section outputs the command to the front-and-rear road wheel driving force distribution control system to reduce the clutch engagement force of the clutch when the driving force is under a control of the reduction of the driving force by means of the traction control system, the subtraction value of the detected value of the clutch transmission torque from the detected value of the clutch input torque is smaller than the predetermined value, and the detected wheel velocities of both of the left and right road wheels are substantially equal to each other.

3. A driving force controlling apparatus for a four-wheel drive vehicle as claimed in claim 1, further comprising: a road surface frictional coefficient estimating section that estimates a frictional coefficient of a road surface on which the vehicle is running, wherein the clutch force reduction controlling section outputs the command to the front-and-rear road wheel driving force distribution control system to reduce the clutch engagement force of the clutch when the estimated road surface frictional coefficient is lower than a set value and other clutch engagement force reduction control conditions are established.

4. A driving force controlling apparatus for a four-wheel drive vehicle as claimed in claim 1, further comprising: a clutch temperature detecting section that detects a clutch temperature of the clutch, wherein the clutch force reduction controlling section outputs the command to the front-and-rear road wheel driving force distribution control system to reduce the clutch engagement force of the clutch when the detected clutch temperature is lower than a set value and other clutch engagement force reduction control conditions are established.

5. A driving force controlling apparatus for a four-wheel drive vehicle as claimed in claim 1, further comprising: a front-and-rear road wheel velocity difference detecting section that detects a front-and-rear road wheel velocity difference between an average value of the road wheel velocities of the front left and right road wheels and another average value of the road wheel velocities of the rear left and right road wheels, wherein the clutch force reduction controlling section is a device to increase a reduction quantity of the clutching engagement force of the clutch as the detected front-and-rear road wheel velocity difference becomes smaller.

6. A driving force controlling apparatus for a four-wheel drive vehicle as claimed in claim 3, wherein the other clutch engagement force reduction control conditions are that the subtraction value of the detected value of the clutch transmission torque from the detected value of the clutch input torque is smaller than the predetermined value and the detected wheel velocities of both of the left and right road wheels of the vehicle are substantially equal to each other.

7. A driving force controlling apparatus for a four-wheel drive vehicle as claimed in claim 3, wherein the road surface frictional coefficient estimating section comprises: a rectilinear force determining section that determines a rectilinear force ($Fx$) applied to a vehicular body according to an engine torque ($T_{ENG}$), a brake torque ($T_{BK}$), engine speed variation (dωt), a road wheel acceleration (dω), and a vehicular specification; and a vertical weight determining section that determines a vertical weight (Fz) applied to the vehicular body according to a weight condition of the vehicle, wherein the road surface frictional coefficient estimating section estimates the road surface frictional coefficient ($\mu$) from the rectilinear force (Fx) and the vertical weight (Fz).

8. A driving force controlling apparatus for a four-wheel drive vehicle as claimed in claim 2, wherein the clutch comprises a frictional clutch, the four-wheel drive vehicle is a front wheel drive based four-wheel drive vehicle, and the acceleration slip detecting section comprises: an estimated vehicular body velocity determining section that determines an estimated vehicular body velocity (Vref(t)) on the basis of a previously determined estimated vehicular body velocity (Vref(t−1)), a model estimated acceleration (a model) estimated by a rectilinear force (Fx) applied to a vehicular body divided by a vehicular body mass, and a unit of time ($\Delta$t); and an acceleration slip quantity calculating section that calculates an acceleration S as follows: S=Vwf−Vref, wherein Vwf denotes a front wheel velocity derived from one of the wheel velocities of the front left and right road wheels which is higher than the other, and wherein the acceleration slip detecting section detects whether the acceleration slip has occurred depending on whether the acceleration slip quantity (S) is equal to or larger than a predetermined slip threshold value (S0).

9. A driving force controlling apparatus for a four-wheel drive vehicle as claimed in claim 8, wherein, when the acceleration slip detecting section detects that the acceleration slip quantity (S) is equal to or larger than the predetermined slip threshold value (S0), the traction control executes the traction control, which further comprises a road surface frictional coefficient estimating section that estimates a frictional coefficient of a road surface on which the vehicle is running, and wherein the clutch force reduction controlling section outputs the command to the front-and-rear road wheel driving force distribution control system to reduce the clutch engagement force of the clutch when the traction control system executes the traction control, the estimated road surface frictional coefficient ($\mu$) is lower than the set value ($\gamma$), the subtraction value (Tinp−Tr) of the detected value of the clutch transmission torque from that of the clutch input torque is smaller than the predetermined value ($\delta$), and the detected wheel velocities of both of the left and right road wheels (Vw1 and Vw2 and Vw3 and Vw4) are substantially equal to each other.

10. A driving force controlling apparatus for a four-wheel drive vehicle, comprising:

front-and-rear wheel driving force distribution controlling means including a clutch disposed in a midway of an engine driving system of the vehicle through front and rear road wheels of the vehicle, the front-and-rear wheel driving force distribution controlling means executing a control to modify a driving force distribution ratio between the front and rear road wheels toward an equal-distribution ratio as a clutch engagement force of the clutch becomes stronger;

road wheel velocity detecting means for detecting a road wheel velocity of each of the front and rear road wheels of the vehicle;

clutch input torque detecting means for detecting a clutch input torque inputted from the engine driving system to the clutch;

clutch transmission torque detecting means for detecting a clutch transmission torque which the clutch is enabled to transmit to an output portion of the clutch; and clutch force reduction controlling means for outputting a command to the front-and-rear wheel driving force distribution controlling means to reduce the clutch engagement force of the clutch when a subtraction value of a detected value of the clutch transmission torque from that of the clutch input torque is smaller than a predetermined value and detected wheel velocities of both of left and right road wheels of the vehicle are substantially equal to each other.

11. A driving force controlling method for a four-wheel drive vehicle, the four wheel drive vehicle comprising a front-and-rear wheel driving force distribution control system including a clutch disposed in a midway of an engine driving system of the vehicle through front and rear road wheels of the vehicle, the front-and-rear wheel driving force distribution control system executing a control to modify a driving force distribution ratio between the front and rear road wheels toward an equal-distribution ratio as a clutch engagement force of the clutch becomes stronger and the driving force controlling method comprising:

detecting a road wheel velocity of each of the front and rear road wheels of the vehicle;

detecting a clutch input torque inputted from the engine driving system to the clutch;

detecting a clutch transmission torque which the clutch is enabled to transmit to an output portion of the clutch; and outputting a command to the front-and-rear wheel driving force distribution control system to reduce the clutch engagement force of the clutch when a subtraction value of a detected value of the clutch transmission torque from that of the clutch input torque is smaller than a predetermined value and detected wheel velocities of both of left and right road wheels of the vehicle are substantially equal to each other.

* * * * *